US011526271B2

(12) United States Patent
Zank et al.

(10) Patent No.: US 11,526,271 B2
(45) Date of Patent: Dec. 13, 2022

(54) ELECTRONIC SIGNATURE CAPTURE VIA SECURE INTERFACE

(71) Applicant: Topaz Systems, Inc., Moorpark, CA (US)

(72) Inventors: Anthony E. Zank, Moorpark, CA (US); Peter W. Dunckel, Fallbrook, CA (US)

(73) Assignee: Topaz Systems, Inc., Moorpark, CA (US)

( * ) Notice: Subject to any disclaimer, the term of this patent is extended or adjusted under 35 U.S.C. 154(b) by 488 days.

(21) Appl. No.: 16/526,669

(22) Filed: Jul. 30, 2019

(65) Prior Publication Data

US 2021/0034230 A1 Feb. 4, 2021

(51) Int. Cl.
| | |
|---|---|
| G06F 3/04883 | (2022.01) |
| G06F 3/0354 | (2013.01) |
| G06F 3/041 | (2006.01) |
| G06F 3/04842 | (2022.01) |
| G06F 3/0486 | (2013.01) |
| G06F 3/0481 | (2022.01) |
| G06F 40/171 | (2020.01) |

(52) U.S. Cl.
CPC ...... *G06F 3/04883* (2013.01); *G06F 3/03543* (2013.01); *G06F 3/03545* (2013.01); *G06F 3/0416* (2013.01); *G06F 3/0481* (2013.01); *G06F 3/0486* (2013.01); *G06F 3/04842* (2013.01); *G06F 40/171* (2020.01)

(58) Field of Classification Search
CPC ............... G06F 3/04883; G06F 40/171; G06F 3/03545; G06F 3/04842; G06F 3/0486; G06F 3/0481; G06F 3/0416

See application file for complete search history.

(56) References Cited

U.S. PATENT DOCUMENTS

| | | | | |
|---|---|---|---|---|
| 5,544,255 A | * | 8/1996 | Smithies | ............ G06Q 20/3821 |
| | | | | 382/119 |
| 5,872,848 A | * | 2/1999 | Romney | ............... H04L 9/3231 |
| | | | | 713/176 |

(Continued)

FOREIGN PATENT DOCUMENTS

EP 0441567 A2 8/1991

*Primary Examiner* — Phenuel S Salomon
(74) *Attorney, Agent, or Firm* — Jeffrey G. Sheldon; Cislo & Thomas LLP

(57) ABSTRACT

A system and method for capturing an electronic signature from a mouse, signature pad, or other input device is disclosed. The system comprises: a signer interface and a separate user interface. The signer interface is configured to present text to a signer via the input device and receive position data representing the points of an electronic signature. The user interface is configured to: select a document for signature based on input from a user, define at least one signature insertion area in the document, define at least one signature capture window, enable the input of position data from the signer interface when the at least one signature capture window is defined, draw at least one signature in the at least one signature capture window; map the at least one signature from the at least one signature capture window to the at least one signature insertion area in the document, and disable the input from the signer interface when the at least one signature is integrated in the document.

18 Claims, 6 Drawing Sheets

(56) References Cited

U.S. PATENT DOCUMENTS

| | | | |
|---|---|---|---|
| 5,892,824 A * | 4/1999 | Beatson | G06K 9/00154 |
| | | | 713/186 |
| 5,909,500 A * | 6/1999 | Moore | G07C 9/35 |
| | | | 382/123 |
| 6,021,202 A * | 2/2000 | Anderson | G06Q 20/401 |
| | | | 713/181 |
| 6,240,444 B1 * | 5/2001 | Fin | H04L 9/40 |
| | | | 709/205 |
| 6,307,955 B1 * | 10/2001 | Zank | G06K 9/00154 |
| | | | 380/30 |
| 6,882,859 B1 * | 4/2005 | Rao | H04B 7/0413 |
| | | | 345/173 |
| 8,799,664 B2 * | 8/2014 | Gantman | H04L 9/3013 |
| | | | 713/176 |
| 8,989,497 B2 * | 3/2015 | Araumi | G06K 9/00409 |
| | | | 382/189 |
| 9,507,760 B2 * | 11/2016 | Dunn | G06F 40/151 |
| 9,514,117 B2 | 12/2016 | Gonser | |
| 9,733,723 B2 | 8/2017 | Bodnar et al. | |
| 10,430,570 B2 * | 10/2019 | Gonser | B42D 25/305 |
| 2001/0043716 A1 * | 11/2001 | Price | G06F 3/0488 |
| | | | 382/100 |
| 2003/0007018 A1 * | 1/2003 | Seni | G06F 3/0237 |
| | | | 715/864 |
| 2004/0022588 A1 | 11/2004 | Lorenzini et al. | |
| 2004/0263486 A1 * | 12/2004 | Seni | G06F 3/0485 |
| | | | 345/173 |
| 2009/0023508 A1 | 9/2009 | Garrett | |
| 2009/0235082 A1 * | 9/2009 | Garrett | H04L 9/3247 |
| | | | 713/178 |
| 2011/0060985 A1 * | 3/2011 | Kerr | G06F 3/04812 |
| | | | 715/702 |
| 2014/0289867 A1 * | 9/2014 | Bukai | G06Q 20/4016 |
| | | | 726/28 |
| 2016/0321214 A1 * | 11/2016 | Hickey | G06F 40/171 |

* cited by examiner

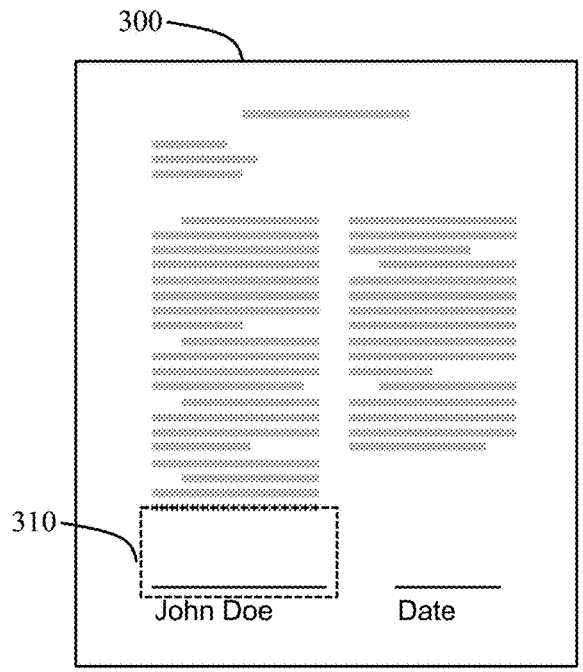 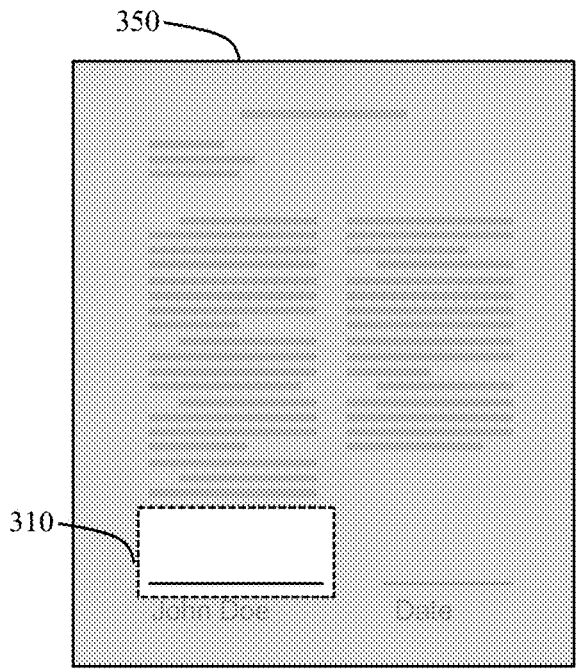
FIG. 3A          FIG. 3B
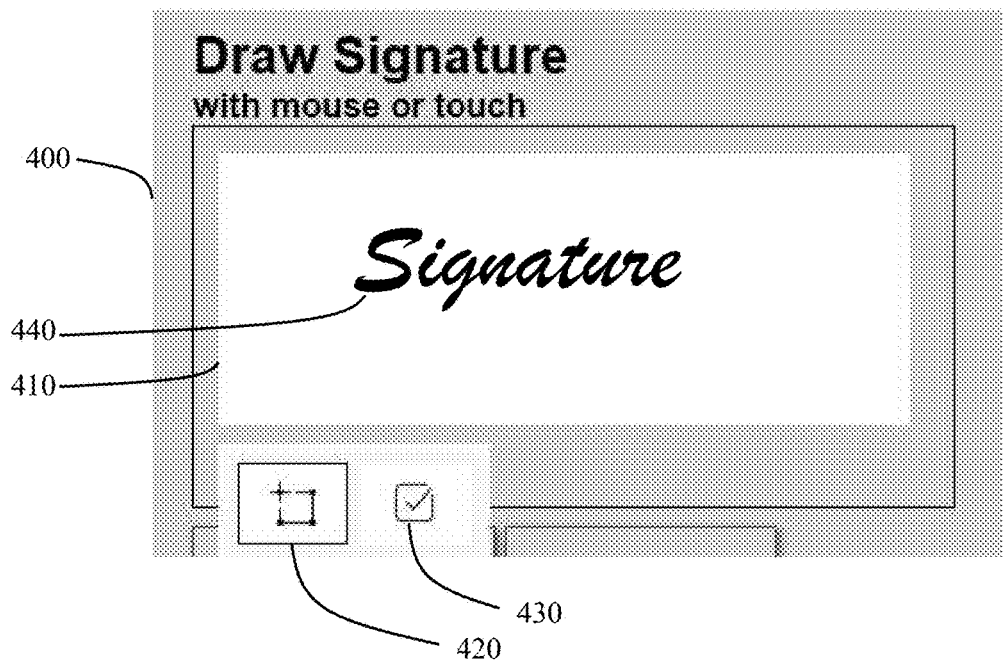
FIG. 4

ELECTRONIC SIGNATURE CAPTURE VIA SECURE INTERFACE

TECHNICAL FIELD

This invention relates to technique for acquiring an electronic signature from a signer using a generic pointing device. In particular, the invention relates to a system and method for selectively enabling input from a mouse or other pointing device for purposes of transmitting signature data while disabling other mouse-type functions more generally.

BACKGROUND

Electronic signature devices for capturing a handwritten electronic signature at the point of sale and use are becoming more and more commonplace.

In some prior art approaches, the person requesting the signature from a signer share their computer with the person signing the document. This may require the person share their mouse or other peripheral device with the person signing. This can be undesirable to many people because of the transfer of germs and bacteria from the signer to the person's peripheral devices. In additionally, the sharing of a pen, mouse, or touch interfaces effectively gives the signer control of mouse-type functionality of the host's computer and possible access to computer and network resources. This can be an unacceptable security risk for most business.

There is therefore a need for a simple and elegant system to acquire signature data from the signer without sharing the computer or installing expensive third-party software.

SUMMARY

The invention features a novel system and method for capturing an electronic signature from a mouse, signature pad, or similar input device without the need for expensive hardware, third-party software, or custom coding. In one embodiment, the system comprises: a signer interface, a separate user interface, and a processor operably coupled to the signer interface and separate user interface. The signer interface can include a signature pad or other input device for entering signature data, and optional display device. The signer interface is configured to present text to a signer via the input device and receive position data representing the points of an electronic signature.

The user interface may include any of a number of peripheral devices with which the user can select, view, and edit documents including a display device, a mouse or other pointing device, and a keyboard or soft keys representing a QWERTY keypad, for example. The user interface is configured to: select a document for signature based on input from a user, define at least one signature insertion area in the document, and define at least one signature capture window.

The processor, which can include a single computer or multiple computers, is configured to enable the input of position data from the signer interface when the at least one signature capture window is defined or otherwise active, receive at least one signature comprising position data from the signer interface; transform the position data—typically absolute position data—from the signature pad to relative position data; draw at least one signature in the at least one signature capture window based on the relative position data; map the at least one signature from the at least one signature capture window to the at least one signature insertion area in the document, and disable the input from the signer interface when the at least one signature is integrated in the document.

In one embodiment, the method for capturing a digital signature via an input device comprises: selecting a document for signature, defining at least one signature insertion area in the document, defining at least one signature capture window, enabling input from the signer interface when the at least one signature capture window is defined, receiving position data representing points of a signature from the input device, transforming the position data from the input device to relative position data; drawing at least one signature in the at least one signature capture window based on the relative position data, mapping the at least one signature from the at least one signature capture window to the at least one signature insertion area in the document, and disabling the input from the signer interface when the at least one signature is drawn. By disabling the signer interface, the present invention prevents the signer from accessing basic functionality available to the user via the application software or operating system, thereby improving security.

The one or more signature insertion areas may be defined by the user with a drag and drop of the user's cursor. In other embodiments, the one or more signature insertion areas are defined by a processor using image analysis techniques to identify signature blocks or other areas requiring a signature in the document. In some embodiments, the user interface is further configured to modulate the width of the line used to draw the electronic signature to produce a more realistic looking signature. In other embodiments, the user interface is configured to: record a sequence of interactions including signature insertion areas based on their locations in the document; and replay the sequence to automatically guide the user and signer through the same sequence of interactions and signature insertion areas, for their convenience.

In addition to improved security, the present invention has a number of other advantages and benefits. The present invention can be used with a number of different input devices including mouse-type pointing device, signature pads, and drawing tools. Each of the devices can employed without the need for custom software modifications to the document or the application used to view and edit the document. In fact, the invention works on any webpage with a mouse or touch enabled component without the need for additional third-party code integration. As the same time, the signer is blocked or walled off from undesired access to mouse-related functions.

BRIEF DESCRIPTION OF DRAWINGS

The present invention is illustrated by way of example and not limitation in the figures of the accompanying drawings, and in which:

FIG. 3A shows a document with a signature insertion area, in accordance with an exemplary embodiment;

FIG. 3B shows a document with the signature insertion area highlighted, in accordance with an exemplary embodiment;

FIG. 4 shows a signature capture window, in accordance with an exemplary embodiment;

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The present invention may be employed in a wide variety of professional settings in which customers are asked to electronically sign digital documents, including retail establishments, hospitals and other healthcare facilities, as well as banks and other financial institutions. These electronic documents can include purchase agreements, contracts, authorization forms, consent forms, etc. The party requesting the signature, herein called the user, provides access to their computer system to a customer, herein called a signer, for purposes of electronically signing the digital document. The present invention provides the signer with a simple and accurate method for signing using a signature pad or touch sensitive device, mouse, pen enabled canvas, or drawing element. The signer, specifically the input device used by the signer, is provided a specific set of privileges for purposes of completing the required form(s), while preventing the signer from editing the digital document, accessing other documents, or navigating through the application or operating system function, more generally.

While using a mouse-type interface to sign a PDF document, for example, the present invention prevents the signer from interacting with the button bar in the viewer application, thereby securing the document and user's computer system from tampering. With the present invention, there is no need to integrate code into a web page, thereby making integration with existing software quicker and easier. The present invention also requires minimal change in a customer's work environment, thereby making operable with low-cost signature pads.

Figure 1:
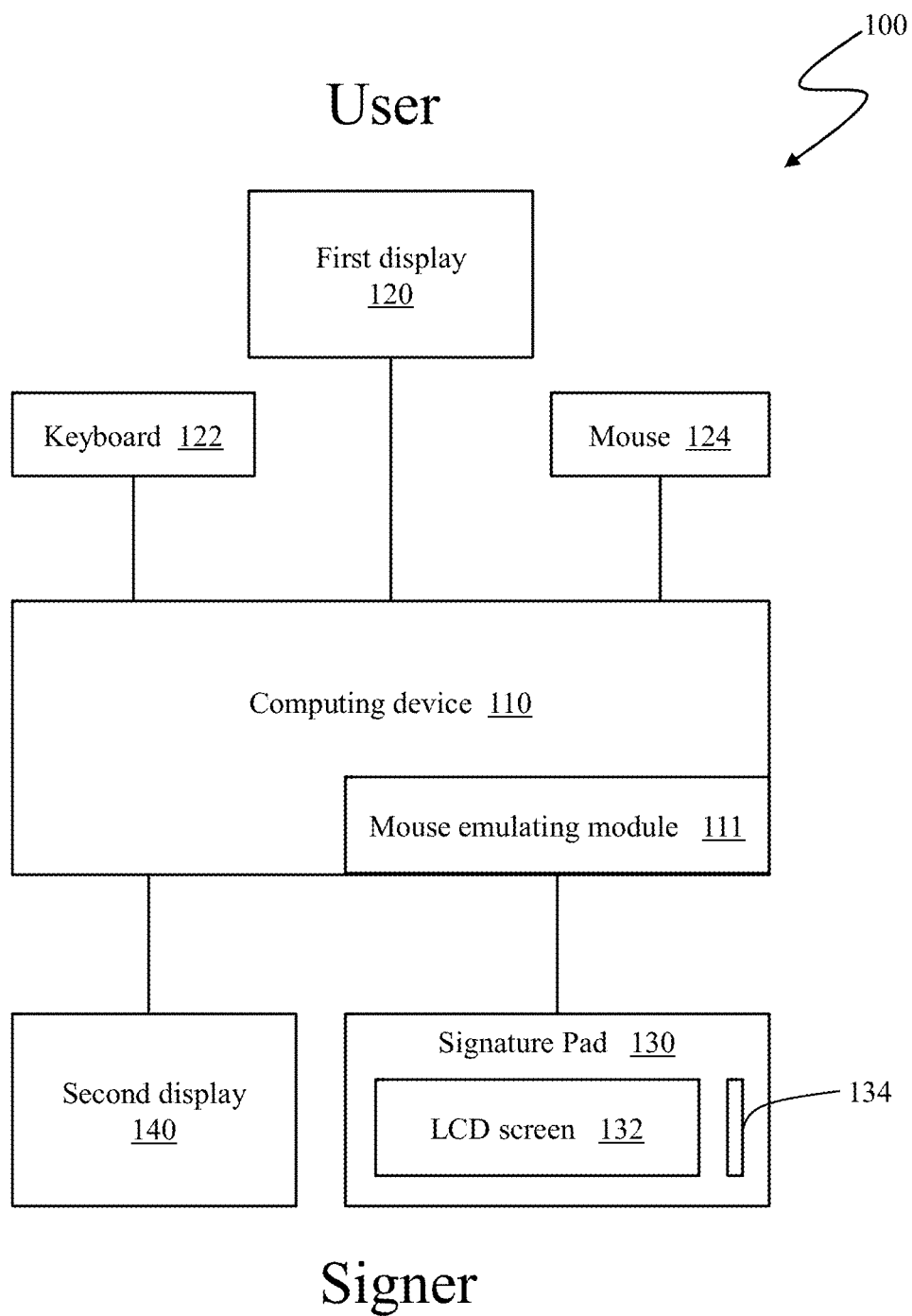
FIG. 1 shows a separate and secure user interface system comprising a signature pad for acquiring an electronic signature, in accordance with an exemplary embodiment.

Referring to FIG. 1, the invention in the preferred embodiment includes a computing system with separate and secure user interfaces (SSUI) for performing electronic signature capture. The SSUI system 100 includes a computing device 110, one or more display devices 120 140 or touch screens, a keyboard 122, mouse 124 or other pointing device, and an electronic signature pad 130 or other signature input device. The computing device 110, in turn, includes a mouse emulation module 111 configured to transform the input of an external device into mouse-type input. The signature pad 130 includes a touch-sensitive LCD display 132 and stylus or pen 134. The signature pad 130 is operably coupled to the computing device 110 through via a mouse emulation module 111. The first display 120, keyboard 122, and mouse 124 are operated by the user, while the second display 140 and signature pad 130 are dedicated for use by the signer.

The user operates the keyboard 132 and mouse 134 for purposes of selecting documents to sign, editing those documents, presenting the documents to the signer, managing the signing process, and saving the executed documents.

The signer, on the other hand, operates only the signature pad 130, which has limited functionality. The electronic signature pad 130 is configured to digitize the signature and then transmit signature data in suitable format to the computing device via an interface such as a USB (Universal Serial Bus) interface (not shown) or a wireless communication link (not shown). The LCD screen 132 may be configured to receive content pertinent to the transaction from the computing device 110, and display that text and graphic on the LCD screen where the signer can review it. This information may include instructions (e.g., "sign here to accept"), legal notifications (e.g., terms and conditions), as well as virtual buttons for the user to press (e.g., "accept" and "cancel").

Consider a hospital setting, for example, with an admitting clerk behind the desk or counter, and the signer in front of the desk or counter. The clerk can administer all the normal admitting functions using the mouse 124, keyboard 122, or touch screen 120. The signer has a signature pad in front of them but never touches the clerk's mouse or touch screen. When it is time for the signer to review the document and sign, the clerk provides the signer with access to the data to be signed via the signature pad 130, printed paper copy, or by displaying the information on the display 120 or auxiliary screen, second display 140. To initiate signing, the clerk uses the mouse to select a signing area on a drawing canvas and instructs the signer to sign in a space on the signature pad 130 (see FIG. 5A). That signature is immediately transferred and drawn into the signing area of the screen. The signer has access to the computing system 110, but only the minimum functionality necessary to sign the document. In some embodiments, the signer interface includes a mouse, but the mouse is limited to the minimum functionality necessary to sign the document. This SSUI system 100, therefore, improves security, prevents novice users from interacting with the hospital's computer terminal, and prevents the transfer of germs and bacteria to the clerk's computer peripherals.

To improve security and prevent tampering, the computing system 110 is configured to limit the functionality of the signer's input device. In some embodiments, the signature pad is enabled, i.e., able to provide input to the computing device 110 during the signing operation, but not before or after. In particular, the signature pad 130 is limited to providing only limited mouse-like functionality during the signing operation, but not before or after. In the preferred embodiment, the computing device 110 receives and responds to input from the signature pad 130 only while entering a signature, and that input is limited to data defining the location of the signature and the data defining the signature itself. All hovering, scrolling, and interactions with the operating system or document viewing application are disabled. The user's access to the computing device, therefore, consists only of the input of signature data, and optionally the selection of an area of a document in which to insert one or more signatures and the approval of those one more signatures.

Figure 2:
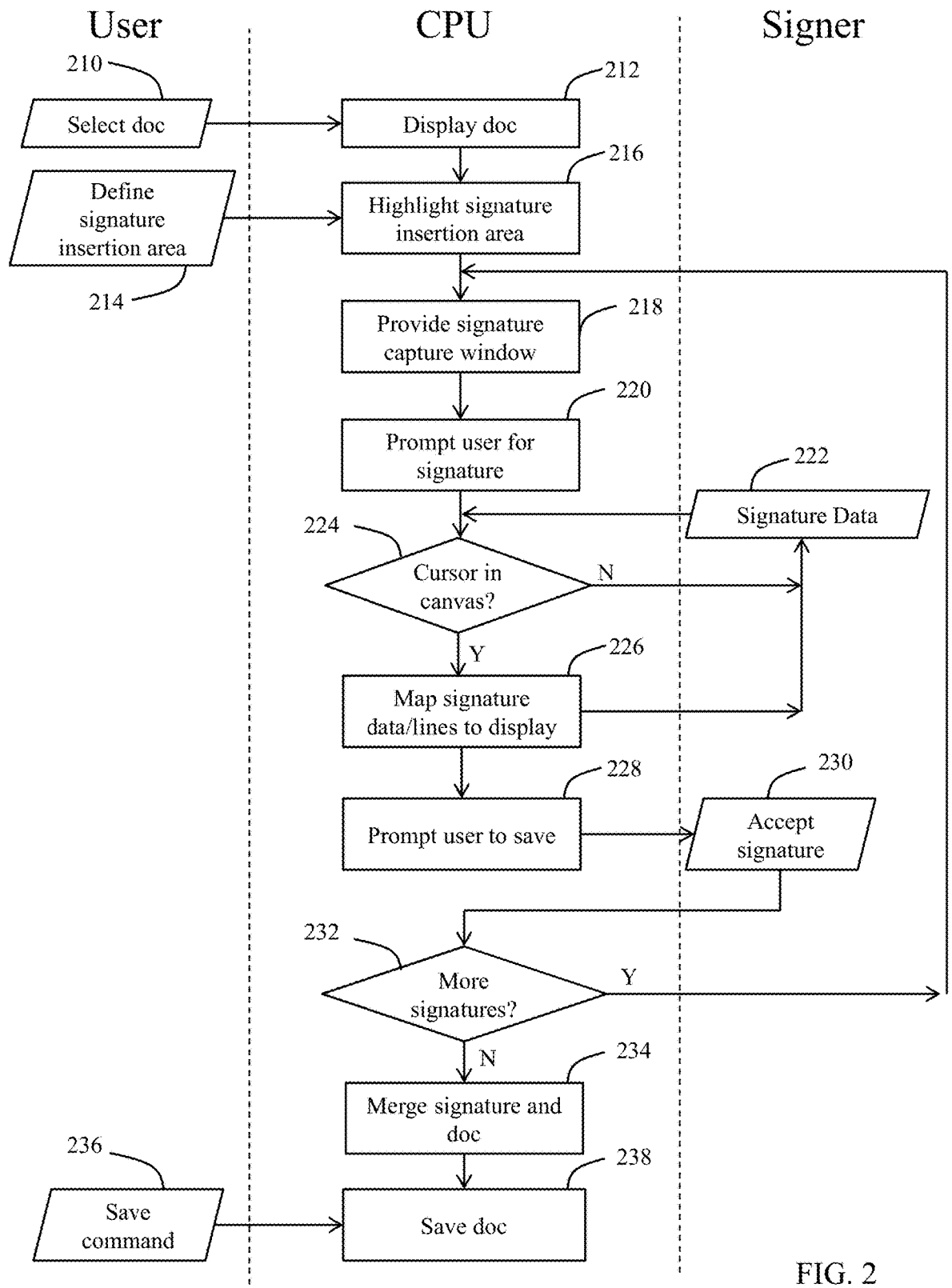
FIG. 2 is a flowchart of the process of providing separate and secure electronic signature capture with two interfaces, in accordance with an exemplary embodiment.

Illustrated in FIG. 2 is a flowchart of the process of performing electronic signature capture with the SSUI system 100 of the present invention. As illustrated, operations in the left column are performed by the user, operations in the center column are performed by the SSUI system 100, and operations in the right column are performed by the signer.

The process begins with the user, e.g., a host at a retail facility, selecting 210 a contract or other document to be signed. The document selected may include any of a number of format types including PDF and WORD™, and launched using any of a number of commercial software applications. The document is then presented 212 on one or more display devices. The document may be presented on the first display 120 if shared by the user and signer, or presented on both the first display 120 and second display 140 if not shared.

The area of the document at which the electronic signature will be inserted, i.e., a "signature insertion area" (see 310 in FIG. 3A), is selected 214 using any of a number of mechanisms. In one embodiment, the user defines a "signature insertion area" by pressing the mouse's left click button on the computer screen, dragging the cursor to a specified point diagonally across from the first selected point, and releasing the mouse's left click button to select a rectangular signing area. Referring to FIG. 3A, the signature insertion area 310 is shown at the signature block in a PDF document 300. Various other manual and automated mechanisms for selecting the signature insertion area are discussed in detail below.

Once the signature insertion area is defined, the SSUI system 100 automatically differentiates the signature insertion area from the remainder of the document for the convenience of the user. In the preferred embodiment, the SSUI system 100 highlights 216 the signature insertion area with respect to the document more generally. As shown in FIG. 3B, the boundary of the signature insertion area 310 is made visible by dimming or shading the document 350, except for the signature insertion area which is displayed with the same brightness and contrast used to display the document 300 before the signature insertion area was selected. In some embodiments, the signature insertion area 310 is dimmed and the remaining portion of the document 300 left unchanged.

In some embodiments, the SSUI system 100 also determines whether or not the dimensions of the signature insertion area correspond to that of the signature pad 130. That is, the SSUI system 100 preferably only permits the selection of a signature insertion area 310 that has the same of similar aspect ratio to that of the LCD screen 132 of the signature pad 130, thereby preventing the signature from being improperly distorted when mapped to the document 300. In other embodiments, the aspect ratio of the signature pad 130 is used to control the aspect ratio of the capture area on the screen to preserve the true aspect ratio of the electronic signature. When the user moves the cursor after pressing the left click button of the mouse, the SSUI system 100 in the preferred embodiment only generates a signature insertion area having the same aspect ratio as the signature pad's LCD screen 132 independent of where the user drops the cursor.

In the preferred embodiment, the SSUI system 100 also generates 218 a signature capture window 400, as is illustrated in FIG. 4, for manually defining the signature insertion area 310. The signature capture window 400 may be displayed (i) at a predefined location on the monitor 120, (ii) in the center of one of the monitor 120, or (iii) in an area determined automatically to be the signing area. To define the signature insertion area 310, the user presses a "define corners" button 420, sets the cursor at one corner, such as the upper left corner of the desired signature insertion area in the document 300, left clicks the mouse 124, drags the cursor diagonally to the bottom right side of the desired signature insertion area, and releases the left click. If the box is acceptable, the user preferably clicks the "check" button 430 and the signature insertion area illustrated in the document at box 310, in the window 400 (namely box 410), or both.

Once the signature insertion area 310 is defined, the computing device 110 in some embodiment is configured to enable input from the signature pad 130. Before this, the signature pad 130 is disabled, thus preventing the signer from having any control over the user's computing device 110 or its operation.

The signer is then prompted 218 to electronically sign on the signature pad 130. The prompt may include the highlighting of the signature insertion area 310, the presentation of the signature capture window 400, or some other notification to the signer.

Figure 5A:
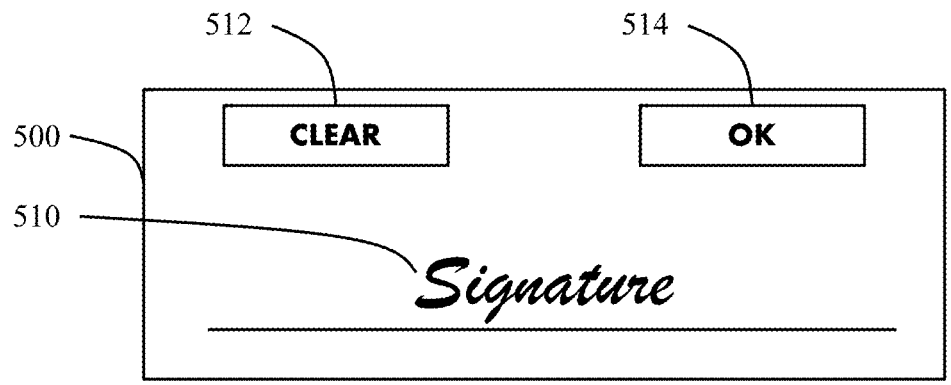
FIGS. 5A-5C show example LCD screenshots, in accordance with an exemplary embodiment.

The user then begins to sign 220 by applying the stylus 134 or a similar signing tool to their signature pad 130 (see FIG. 5A). After each first touch of the signing tool to the signature pad, the computing device's cursor is set to drawing mode. The draw mode may also be triggered, for example, when the user initially left clicks the mouse 124 to define the signature insertion area. As the signer signs on the signature pad, the signature pad 130 generates signature data, i.e., x and y coordinates, based on where the stylus touches the LCD screen 132. The signature data are transmitted to the computing device 110 where they are mapped 226 to the signature capture window 400 to produce signature 440 displayed in the current arrangement of monitors. The signature data may be scaled accordingly if the aspect ratio of the signature insertion area 410 is different than the aspect ratio of the LCD screen 132 of the signature pad 130.

In the preferred embodiment, each point of signature data (x, y) is received 222 and mapped 226 from the signature pad 130 to the signature insertion area 410 and a line drawn connecting that point to the previous point. If the stylus leaves the LCD screen 132 for any reason, decision block 224 is answered in the negative and no drawing operation is performed until the stylus again touches the LCD screen.

In the preferred embodiment, the mouse emulating module 111 maps the input from the signature pad 130 to the signature capture window 400. In doing so, the mouse emulating module 111 transforms a data protocol specific to the signature pad 130 to a different data protocol used by a conventional mouse, typically the Human Interface Device (HID) Protocol. In the preferred embodiment, for example, the data from signature pad 130 locates the stylus using x and y coordinates, where those coordinates are absolute measurements with respect to a fixed point of the LCD display. This fixed point represents the origin in this reference frame used by the protocol. In contrast, the input from a generic mouse represents relative movement of a mouse pointing device, i.e., Δx and Δy position data indicative of the direction and distance that the mouse has been moved since the last data point. That is to say, the mouse position data comprises location data for a series of points, where the location of each point is defined in terms of the relative position of the previous point in the sequence. The mouse emulating module 111 effectively converts the absolute position measurements from the signature pad 130 to relative position measurements to emulate a generic mouse pointing device. In response, the computing device 110 is able to read and interpret the position data without any proprietary device driver or custom software coding. The computing device 110 then strings together the position data to produce a complete signature while, at the same time, preventing the signer from performing any other mouse-type functions, namely cursor movement, hovering, scrolling, or activation of software buttons on the document display software or operating system more generally.

Upon completion of the signature, the signer is prompted 228 to accept a signature 510 just entered using the LCD screen's signature interface 500 shown in FIG. 5A, for example. To accept 230, the user need only touch the stylus to the "OK" button 514. If not acceptable, the signer presses the "clear" button to delete the current signature data.

Once the signature 510 is accepted, the SSUI system 100 determines whether there are more electronic signatures to be added to the document. If there are more signatures to be added to the document 300, a decision block 232 is answered in the affirmative and the SSUI system 100 advances to the next signature block. In some embodiments, the user scrolls to the next signature block and manually selects the signature insertion area, and the process above repeated until each electronic signature is added. In some other embodiments, the SSUI system 100 is configured to record the location of each signature insertion area 310 in the form of sequence based on the locations of the signature insertions areas and the interactions necessary to navigate to each of the areas. Thereafter, the SSUI system can automatically skip to each signature insertion area with little or no user interaction.

If there are no more signatures, the decision block 232 is answered in the negative and the SSUI system 100 generates a software object for each signature and embeds or otherwise merges 234 the one or more objects into the document based on the coordinates of the document and signature capture area represented in the display 120. The drawing mode used for capturing the electronic signature from the signature pad 130 is also disabled at the computing device 110. Thereafter, the user may click 236 to save 238 or otherwise store the document with the one or more electronic signatures.

Automatic Selection of Signature Insertion Areas

In some embodiments, the size, shape, and location of the signature insertion areas are prerecorded by the user and the recording played back with a signer in order to automate the process. To record the location of each signature insertion area, the user pushes a "record" button and the SSUI system 100 records user interactions with the software application for viewing/editing the document. During the recording period, any interactions with the application—including cursor selections, cursor movement, scrolling, and user-selected signature insertion areas—are recorded and saved for later retrieval. When the user has completed the recording of the interactions, the user pushes a "stop" button to end the recording. The user is prompted to name and save this recording for later use. The sequence of interactions from "record" to "stop" are compiled into a set of machine-readable instructions, preferably in the form of a script, that can be replayed at a later time. The time, location, and the screenshots and other information related to the applications for each interaction may also be incorporated with the script for ease of use.

After a recording is generated, the user merely selects and "plays" or "replays" the recorded script, which causes the SSUI system 100 to automatically repeat the user's recorded interactions including the selection of the signature insertion areas as well as the process of navigating between signature insertion areas in the document. The SSUI system, therefore, automates and accelerates the steps necessary to acquire the signatures and fully execute the document.

For the first recorded signing within a recording, the SSUI system 100 prompts the user or signer to specify one of two optional modes. In the first mode, the SSUI system 100 prompts the signer to sign for each selected signing area in the recording. In the second mode, the SSUI system 100 prompts the signer to sign once. Thereafter, the one signature is captured and entered into each subsequent signature insertion area. In either mode, the user or signer selects a button or presses a key to navigate from one recorded signature insertion area to the next. The user may skip one or more recorded signature insertion areas or end the replay at any time. If a recorded interaction or recorded signature insertion is not found, then the SSUI system 100 prompts the user on how they wish to continue. The user may then stop the replaying of the selected recording or skip to the next recorded signature insertion area. Once, the user has finished signing all of the recorded signature insertion areas, the SSUI system notifies the user that the replaying has ended and whether there were any issues with replaying the selected recording.

In accordance with the present invention, the SSUI system 100 is configured to enable the signer to use the electronic signature pad to control a computer's cursor, but only to a very limited extent described herein. These deliberate limitations include a limit on functionality and also in terms of signing region. It enhances the function of a standard signature pad to control a cursor by mapping one's signature on the signature pad to a select area on one or more monitors.

Methods for Selecting Signing Areas

The SSUI system 100 may employ up to six mechanisms for defining or finding each signature insertion area: (1) processed after manual selection, (2) automatic selection via image processing, (3) automatic selection via indication technology and image processing, (4) moving/dragging or resizing a signature capture window, (5) defining pre-sized signature capture windows that can be moved/dragged from a predefined location, and (6) automatically selecting previously selected areas using saved data and image processing. Each of the six mechanisms can be initialized through user settings or user selection of hots keys, cursor clicks, or voice/speech commands.

The first mechanism for selecting the signature insertion area includes pressing the mouse's left click button on the computer display 120, dragging the cursor to a specified point diagonally across from the first selected point, and releasing the mouse's left click button to define a rectangular signing area. After dragging the computer display's cursor across the desired area, the signature insertion area is highlighted to show the boundaries of the selected area.

The second mechanism for selecting the signing area includes the automatic selection of the signature insertion area as determined by the computing device 110. The computing device 110 includes an image processing module that performs filtering on a snapshot of the monitor or monitors as a whole. First, the image processing module transforms each of the colors in the monitor snapshot into its corresponding grayscale. Then dilatation is performed in order to obscure the small details within the snapshot. Next, the snapshot is pixelated to break down curves within the snapshot. Then all colors that are not white are turned black using threshold image processing. Lastly, a canny edge detector is used to determine which areas in the snapshot are likely signing areas. If the image processing module concludes that a specific area on the screen is a potential signing area, then the area is highlighted on the user's screen for the user to select. If there is only one area detected as a potential signing area, then this signing area is automatically selected.

The third mechanism for selecting a signature insertion area utilizes indication technology, such as QR codes, vibrant colors, patterns, and image processing to determine whether a signing area is located within a webpage. A touch, mouse, or pen enabled component can be wrapped with an indicator, such as a QR code that is encoded with specific coordinates that specify where on the web page a touch enabled signature insertion area is located within a web page. The SSUI system 100 performs image processing to read all the monitors for this indicator. Once it finds an indicator, the indicator is read to discover where on the web page the touch enabled signature insertion area is located. The signature pad's pen input is then mapped to the touch enabled signing area that was discovered via reading the indicator.

The fourth mechanism for selecting a signature insertion area includes moving, dragging, and/or resizing the signature capture window 400 to fit the signature insertion area. This selection method allows the user to reconfigure the location of the displayed signature capture window by moving or dragging the window over a signing area and/or resizing the signature capture window to fit the dimensions of a signing area. Once a signature capture window is reconfigured for a signature insertion area, the signature data and LCD screen are cleared.

The fifth mechanism for selecting a signature insertion area is to move/drag a pre-sized signature capture window to a signing area. The user can define differently sized signature capture windows 400 and then select the pre-sized signature capture window that they wish to use for signing. The user defines the size of the signature capture window 400 either through saving a previously selected signature capture window's size or by defining the size within settings. The user can also specify the location on the monitor(s) the signature capture window is to be presented initially as well as hot keys to open the pre-sized window. Once a signature capture window is defined, it is accessible by selecting a docked button or pressing specified keys.

The sixth mechanism for selecting a signature insertion area includes the automatic selection of previously selected areas using saved data and image processing. Once one of the other five selection methods has been completed, the SSUI system 100 can remember the actions and recognize the next time it should automatically select this area. This is achieved by saving or storing screenshots and/or snapshots and the location of the selected signing area of these selections in order to determine whether any current or future screens have snapshots that resemble the saved snapshots. If image processing determines that a saved snapshot resembles any snapshot on the screen(s) before or during the selection process, then the SSUI system 100 is configured to automatically select the signature capture area that corresponds with the selected signature capture area for the saved snapshot. If multiple saved snapshots are discovered to resemble one or more snapshots on the screen(s), then the user will be prompted to make a selection between each resembling snapshot's signature capture area(s).

Display of LCD Content

The present SSUI system 100 is further configured to provide an interface for enabling a user to incorporate components—including text, buttons, and images—to be displayed on the LCD screen 132, and to generate navigation for these components. This will allow users to provide, and signers to access, the content for which they are signing. Two methods that allow for the quick customization of the signature pad 130 of the SSUI system are: (a) transfer selected text to the LCD screen and (b) visually edit and format the content to be displayed on the LCD screen.

With regard to the transfer of selected text, the SSUI system 100 is configured to record and transfer text to the signature pad 130 when the user (i) selects the desired text to be added to the LCD, and (ii) enters a preconfigured keyboard shortcut for adding the selected text to the LCD screen, herein referred to as the "text add" key combination. After the text is transferred to the signature pad 130, the LCD screen is then configured to display all the uploaded text with a built-in ability to navigate through the text to the signature interface 500.

Figure 5B:
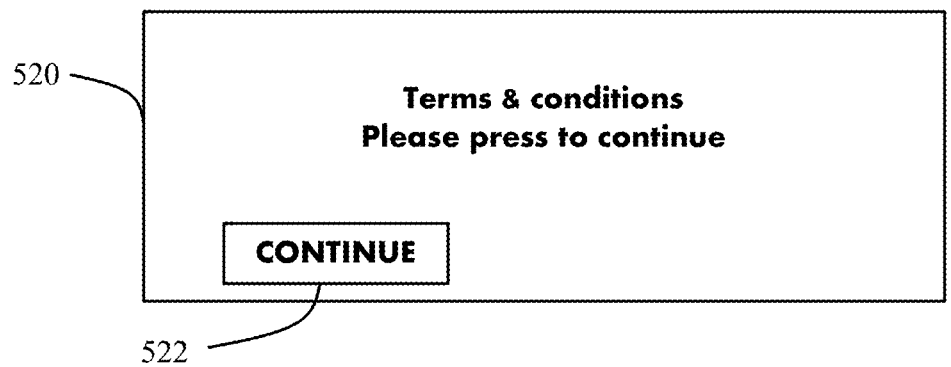
Figure 5C:
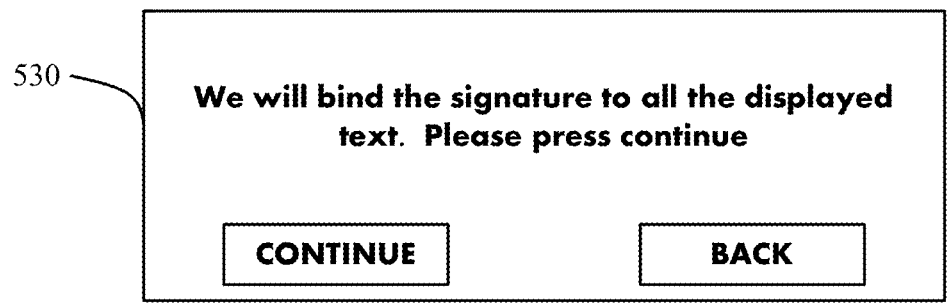

The SSUI system 100 is also configured to conveniently aggregate blocks of text from different sources. To attach blocks of text located in different source documents and files, the user merely selects each block of text and types the "text add" key combination. Each time the "text add" key combination is entered, the SSUI system 100 adds the new block of text to previously selected block(s) of text stored to form a sequential list of text attachments. After attaching all blocks of text, the user can add the text blocks to the LCD screen 132 by using the "text add" key combination again. The content may appear in the form of a series of notices provided to the signer via the LCD screen 132. For example, this text may include a series of windows disclosing the Terms & Conditions 520 with a new portion of the agreement being presented each time the signer uses the stylus 134 to select the "continue" button 522, as shown in FIG. 5B. The last text to be displayed generally includes a conclusion window 530 informing the signer that their signature(s) will be incorporated into the document being executed, as shown in FIG. 5C.

In addition, a second keyboard shortcut, referred to as the "text clear" key combination, can be used to expunge the text from the LCD screen as well as the list text attachments, thereby resetting the LCD screen to the signature interface 500 only.

With regard to visually editing and formatting content, the SSUI system 100 is configured with a graphical user interface (GUI) for visually creating content to be displayed on the LCD screen. The GUI enables the user to select and add images, buttons, and text to a canvas that is subsequently displayed on the LCD screen of the signature pad 130. The GUI also enables the user to select the navigation and events that occur when the components are selected with the stylus, for example. Editing of the navigation and events is done on a per device basis, and the content loaded based on the model and manufacturer of the signature pad in use. All of the data from the GUI is transformed into a script for subsequent review and editing by the user. Once the content is uploaded and the navigation and events defined, the visual and textual editor is used to display content on the LCD screen when the signing process begins.

Signature Verification

One aspect of the present invention includes the enhancement of the mouse-function-drawn graphical signature with graphical or biometric cues. In some embodiments, the SSUI system 100 is configured to drawing the biometric cues on the canvas during the capture process. For example, the SSUI system 100 may modulate the pen width according to the velocity of the stylus 134, the width of the stylus, the pressure on the stylus. In the preferred embodiment, fixedtime-interval cues are acquired during acquisition of the signature to show the relative time interval of sequential segments of the signature when signed.

Figure 6A:
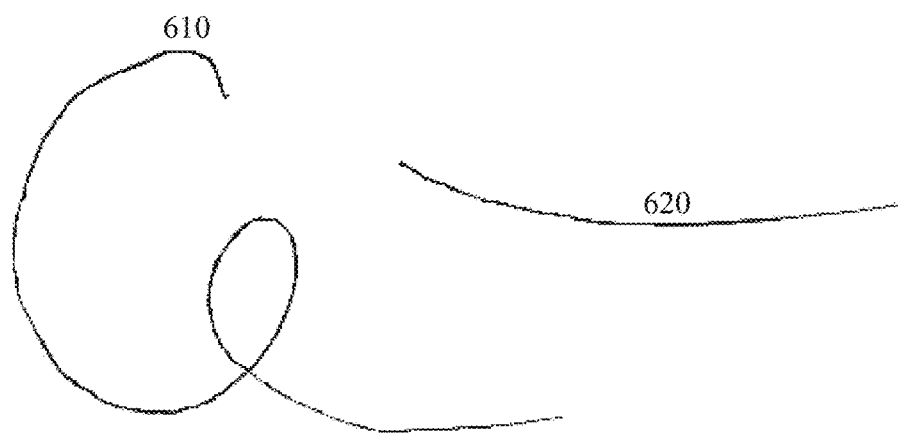
FIG. 6A shows a pair of electronic signature lines with uniform thickness, in accordance with an exemplary embodiment.
Figure 6B:
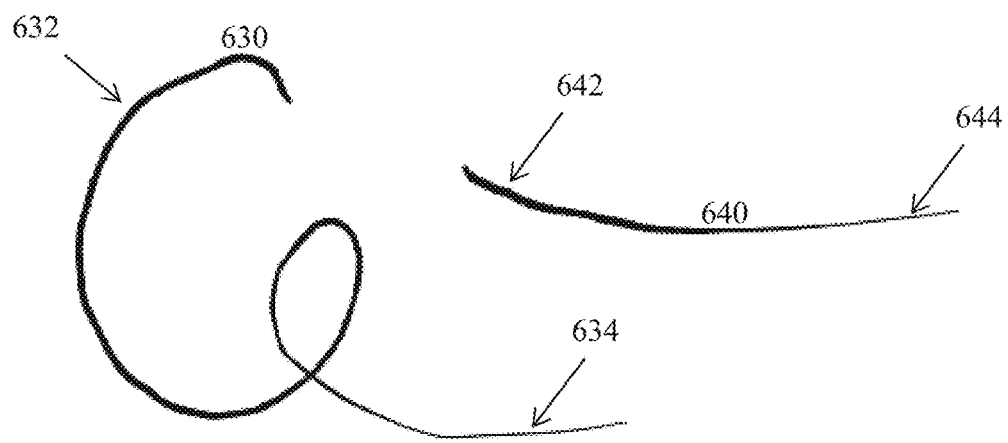
FIG. 6B shows a pair of signature lines with variable thickness, in accordance with an exemplary embodiment.
Figure 6C:
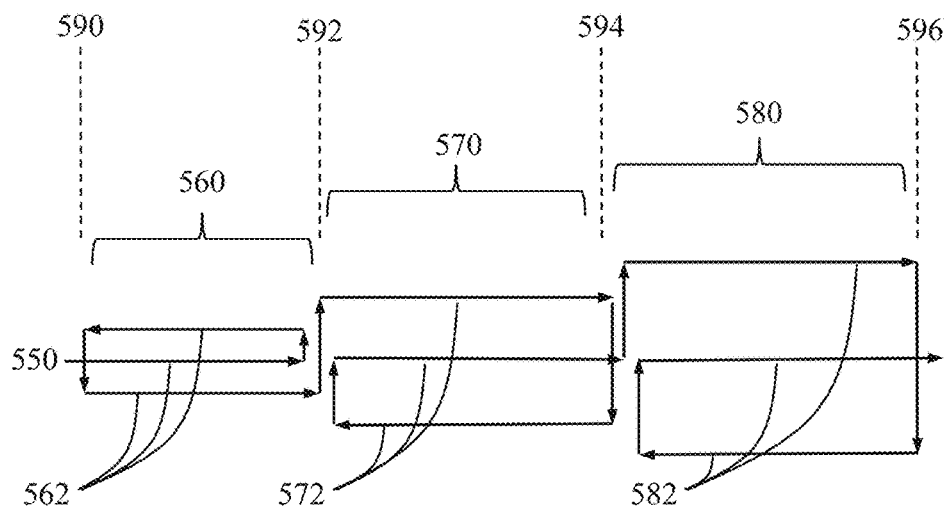
FIG. 6C shows a portion of a signature modulated with three line widths, in accordance with an exemplary embodiment.

A pair of signature lines with uniform, fixed-width lines 610, 620 and no modulation are illustrated in FIG. 6A. The same pair of signature lines 630, 640 with line width modulation are shown in FIG. 6B. As can be seen, the leading portions 632, 642 of the lines are drawn relatively thick on the digital document, and then taper down to thin lines at the trailing portions 634, 644 of the lines. This line width modulation is achieved in the present invention by varying the thickness of the segment of signature line based on the distance between uniform time markers. In the preferred embodiment, the line segments are then drawn with a thickness that is inversely proportional to the length of the segment of the signature line between sequential time marks or time stamps. Short segments of signature line (indicating relatively small movement of the stylus during a time interval) are then made thick, for example, while long segments of signature line (indicting relatively large movement of the stylus during a time interval) are made thin.

Illustrated in FIG. 5C is portion of signature line 550 with line width modulation in accordance with the preferred embodiment. The signature 550 progresses from left to right while the thickness is measured by the vertical width of the line structure drawn. The line width modulation is achieved by the SSUI system 100 by drawing three parallel line between each pair of time marks 590, 592, 594, 596. Each of the three parallel lines possesses the same thickness, but the spacing between the lines is varied to modulate the signature thickness. The portion of signature illustrated corresponds to three pairs of time marks producing three consecutive segments 560, 570, 580 of signature line, each with a different line width.

As shown in FIG. 5C, the first segment 560 is produced with three parallel lines 562 drawn by the SSUI system 100 with relatively small gaps there between. The second segment 570 is also produced with three parallel lines 572 but larger gaps there between. The third segment 580, the widest line segment, is again produced with three parallel lines 582 characterized by the largest gaps there between. As drawn, this portion of signature line grows from thin to heavy as it progresses from left to right. The present invention, therefore, creates the impression of a variable line width or a time-stamped graphic by modulating the path of the electronic ink being applied to the canvas.

SSUI System Functional Block Diagram

Figure 7:
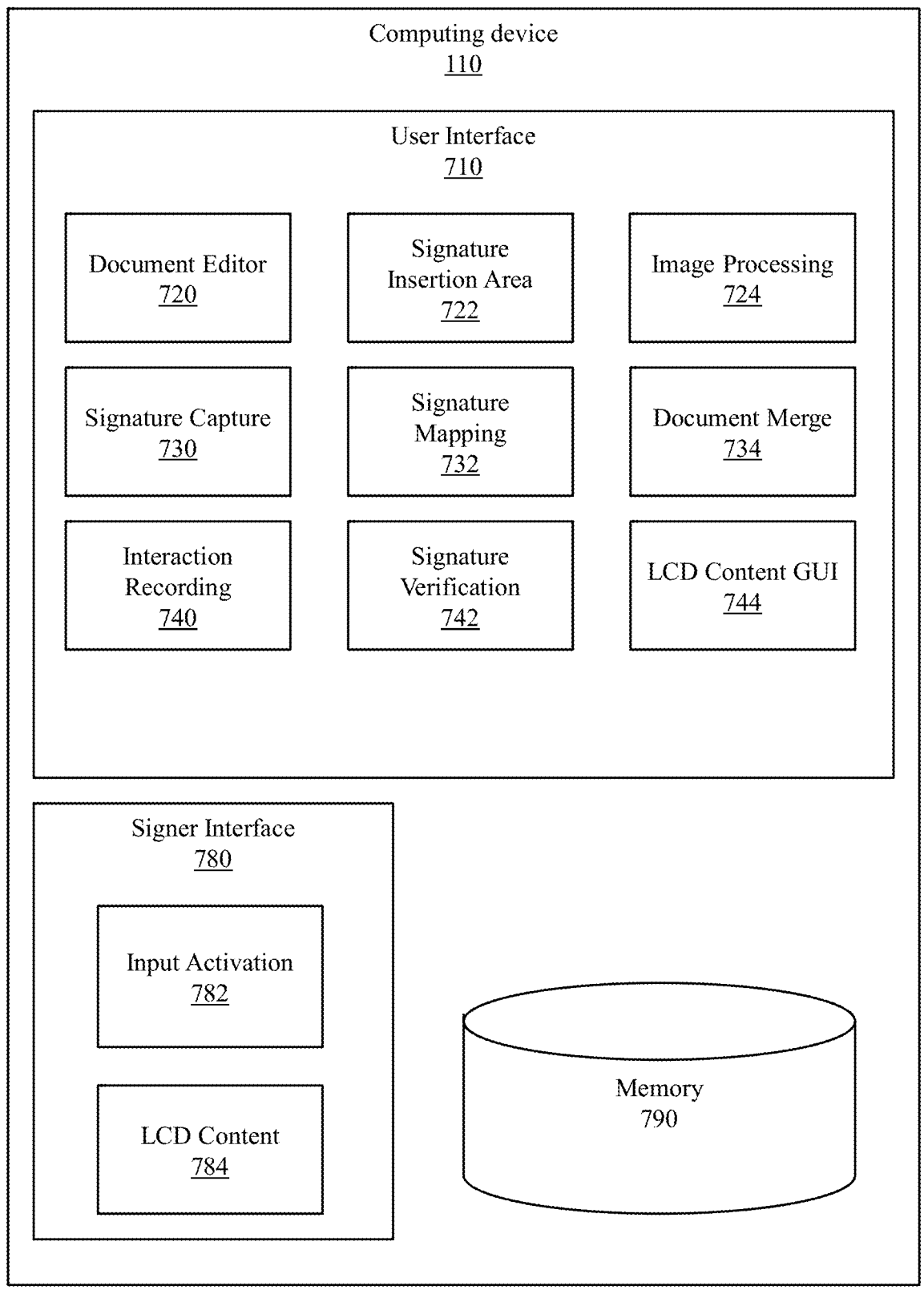
FIG. 7 shows a functional block diagram of the computing device, in accordance with an exemplary embodiment.

Illustrated in FIG. 7 is a functional block diagram of the computing device 110 of the SSUI system 100. The computing device 110 may be a stand-alone computer, terminal, server, or network of computers, linked by means of a LAN (Local Area Network), WAN (Wide Area Network), MAN (Metropolitan Area Network), the Internet, or combination thereof. In some embodiments, the computing device 100 includes at least a user interface 710, a signer interface 780, and a memory store 790. The signer interface may include the following components or modules:

Document Editor 720 to enable the user to view and edit PDF and WORD™ documents for purposes of revising the documents to include electronic signatures comprising electronic ink, in accordance with the invention taught herein.

Signature Insertion Area Module 722 to enable the user to manually identify one or more areas of a document requiring a signature, and define the location, size, and shape of the signature insertions areas to which a signature is mapped.

Image processing Module 724 configured to use image analysis, object recognition, and/or machine learning to automatically identify one or more areas of a document requiring a signature, and define the location, size, and shape of the signature insertions areas to which a signature is mapped.

Signature Capture Module 730 configured to generate a signature capture window 400, enable the user to define a signature insertion area if necessary, and prompt the signer to input a signature via the signer interface 780.

Signature Mapping Module 732 configured to receive raw signature data from a signature pad 130 or other input device and scale that signature data in accordance with an associated signature capture window and signature insertion area.

Document Merge Module 734 configured to convert signature data into signature objects and embedded those objects at the designated location in a document.

Interaction Recording Module 740 configured to (i) record a set of user interactions with the document, including scrolling and signature insertion area selection, and (ii) replay that set of interactions when a signer is executing the same document.

Signature Verification Module 742 configured to vary the line width of an electronic signature based on one or more parameters including the speed with which the signature, or portions of the signature, are generated by the signer, thus producing realistic appearing electronic signatures.

LCD content GUI 744 configured to enable the user to (i) save and aggregate text selected by the user for display on an LCD screen 132, (ii) generate navigation buttons and events for content displayed on the LCD screen, (iii) and generate graphics to be displayed on the LCD screen.

The signer interface 780 includes an Input Activation Module 782 and a LCD Content Module 784. The Input Activation Module 782 is configured to selectively enable and disable input from the signature pad 130 or other input device. In the preferred embodiment, the Input Activation Module 782 enables the input of signature data from the signature pad 130 when a signature insertion area is defined. The Input Activation Module 782 then disables input from the signature pad after the signer has penned and accepted their signature. Before being enabled and after being disabled, the input from the signature pad 130 is effectively disregarded by the Input Activation Module 782 to prevent the signer from making unauthorized changes to the document, application, or operating system.

The LCD Content Module 784 is configured to upload text and graphics to the signature pad 130, and to receive the signature data and other inputs from the signer when the input is activated by the Input Activation Module 782.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer, processor, electronic circuit, or module capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including electronic circuits such as personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

What is claimed is:

1. A system for capturing a digital signature into a document via a signature pad, the system comprising:
    a. a signer interface configured to:
        i. present text to a signer via the signature pad; and
        ii. receive position data from the signature pad;
    b. a user interface configured to:
        i. select the document for signature based on input from a user, wherein the user is different than the signer;
        ii. define at least one signature insertion area, each signature insertion area corresponding a location in the document;
        iii. define at least one signature capture window corresponding to the signature insertion area;
    c. a processor configured to execute machine readable instructions comprising an operating system and at least one application, wherein the processor is configured to:
        i. enable signature data input from the signer interface to the operating system and the at least one application when the at least one signature capture window is defined, wherein the signature data input consists of only signature data;
        ii. receive signature data comprising at least one signature, wherein the signature comprises position data from the signer interface;
        iii. transform, for each signature, the position data from the signature pad to relative position data;
        iv. draw the at least one signature in the at least one signature capture window based on the relative position data;
        v. map the at least one signature from the at least one signature capture window to the at least one signature insertion area in the document; and
        vi. disable all input from the signer interface once the at least one signature is drawn, wherein the disabled input comprises signature data; wherein the signer has no control over the processor or its operation.

2. The system in claim 1, wherein the relative position data comprises a sequence of points, each point having a location measure relative to the previous point in the sequence.

3. The system in claim 1, wherein the signature pad comprises an LCD display, and the position data from the signature pad comprises coordinates indicating where contact is made with the LCD display in terms of a lateral location x and vertical location y of contact with respect to a predefined origin.

4. The system of claim 1, wherein the input from the signer interface is disabled once the at least one signature is received from the signer interface.

5. The system of claim 1, wherein the position data is used to draw the at least one signature in, and only in, the at least one signature capture window.

6. The system of claim 1, wherein define the at least one capture window further is based on selection of the at least one capture window by a user.

7. The system of claim 1, further comprising a processor, wherein define the at least one capture window further is based on selection of the at least one capture window by the processor.

8. The system of claim 1, wherein the user interface is further configured to modulate a line width of the signature when the signature is drawn in the signature capture window.

9. The system of claim 1, wherein the user interface is configured to:
    a. record a sequence of signature insertion areas based on their locations in the document; and
    b. replay the sequence to automatically navigate through the same sequence of signature insertion areas.

10. A method for capturing a digital signature with a computing device via a signature pad, wherein the computing device is configured to execute machine readable instructions comprising an operating system and at least one application, the method comprising:
    a. selecting a document for signature, wherein the document is defined via one application of the at least one applications;
    b. defining at least one signature insertion area, each signature insertion area corresponding a location in the document;
    c. defining at least one signature capture window;
    d. enabling input from the signature pad to the computing device when the at least one signature capture window is defined, wherein the input consists of position data;
    e. receiving the position data from the signature pad, the position data representing points of a signature from a signer;
    f. transforming the position data from the signature pad to relative position data, wherein the signature pad is configured to emulate a mouse pointing device;
    g. drawing at least one signature in the at least one signature capture window based on the relative position data;
    h. mapping the at least one signature from the at least one signature capture window to the at least one signature insertion area in the document; and
    i. disabling all input from the signer interface to the computing device when the at least one signature is drawn.

11. The method in claim 10, wherein the position data from the signature pad comprises absolute position data indicating a point of contact relative to a fixed origin.

12. The method in claim 10, wherein defining one or more signature insertion areas comprises dragging and dropping of a cursor by a user.

13. The method in claim 10, wherein the position data is used to draw the at least one signature in, and only in, the at least one signature capture window.

14. The method in claim 10, wherein defining the at least one capture window further comprises receiving a selection of the at least one capture window from a user.

15. The method in claim 10, wherein defining the at least one capture window further comprises automatically identifying a selection of the at least one capture window by a processor.

16. The method in claim 10, further comprising modulating a line width of the signature when the signature is drawn in the signature capture window.

17. The method in claim 10, further comprising:
   a. recording a sequence of signature insertion areas based on their locations in the document; and
   b. replaying the sequence to automatically navigate through the same sequence of signature insertion areas.

18. A system for capturing a digital signature via a signature pad configured to present text to a signer and generate position data, the system comprising a computing device with a user interface, and a signer interface, wherein the signer interface comprises the signature pad for acquiring an electronic signature; the user interface configured to:
   i. receive an indication of a document selected for signature based on input from a user, wherein the user is different than the signer;
   ii. receive an indication of at least one signature insertion area, each signature insertion area corresponding a location in the document;
   iii. receive an indication of at least one signature capture window;
   iv. enable signature data input comprising position data from the signature pad to the computing device when the at least one signature capture window is defined;
   v. transform the position data from the signature pad to relative position data;
   vi. acquire at least one signature in the at least one signature capture window based on the relative position data;
   vii. map the at least one signature from the at least one signature capture window to the at least one signature insertion area in the document; and
   viii. disable all command input from the signer interface to the computing device when the at least one signature is acquired.

* * * * *